(12) United States Patent
Hill

(10) Patent No.: US 8,910,906 B2
(45) Date of Patent: Dec. 16, 2014

(54) ARTICULABLE ROTATIONAL COUPLING FOR AN AIRCRAFT

(75) Inventor: David G. Hill, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 312 days.

(21) Appl. No.: 13/471,838

(22) Filed: May 15, 2012

(65) Prior Publication Data

US 2013/0306801 A1    Nov. 21, 2013

(51) Int. Cl.
*B64C 13/24* (2006.01)
*F16D 3/02* (2006.01)

(52) U.S. Cl.
USPC ........... 244/99.2; 244/131; 244/213; 464/113

(58) Field of Classification Search
USPC ................... 244/99.2, 99.3, 129.1, 131, 213; 464/113, 134, 136
See application file for complete search history.

(56) References Cited

U.S. PATENT DOCUMENTS

| | | | |
|---|---|---|---|
| 132,790 A | 11/1872 | Backus | |
| 1,894,986 A | 1/1933 | Frins | |
| 3,045,454 A | 7/1962 | Rueb | |
| 4,286,761 A * | 9/1981 | Musgrove | 244/99.2 |
| 4,523,891 A | 6/1985 | Schwartz et al. | |
| 4,676,669 A | 6/1987 | Byrnes et al. | |
| 4,714,450 A | 12/1987 | Byrnes et al. | |
| 4,778,129 A | 10/1988 | Byford | |
| 4,779,820 A | 10/1988 | Lambert | |
| 5,092,738 A | 3/1992 | Byrnes et al. | |
| 5,496,219 A * | 3/1996 | Anspach et al. | 464/119 |
| 5,525,110 A * | 6/1996 | Riccitelli et al. | 464/118 |
| 5,743,490 A | 4/1998 | Gillingham et al. | |
| 6,287,206 B1 * | 9/2001 | Stage | 464/119 |
| 7,445,180 B2 | 11/2008 | Plude et al. | |
| 7,681,837 B2 | 3/2010 | Nakamura et al. | |
| 2006/0186262 A1 | 8/2006 | Fenny et al. | |
| 2007/0213136 A1 | 9/2007 | Borges et al. | |
| 2008/0108446 A1 * | 5/2008 | Faude | 464/136 |
| 2011/0253832 A1 * | 10/2011 | Wildman et al. | 244/99.13 |

OTHER PUBLICATIONS

European Search Report for Application No. 13167349.3-1756 completed on Jul. 29, 2013.

* cited by examiner

*Primary Examiner* — Benjamin P Lee
(74) *Attorney, Agent, or Firm* — Carlson, Gaskey & Olds, P.C.

(57) ABSTRACT

An airfoil surface control system includes a movable surface. An actuator is coupled to the surface. The airfoil surface control system includes a motor. A torque tube assembly operatively couples the motor and actuator and includes first and second shafts coupled by a universal joint. The universal joint is configured to provide a first maximum angle between the first and second shafts. A stop is configured to provide a second maximum angle between the first and second shafts that is less than the first maximum angle.

13 Claims, 4 Drawing Sheets

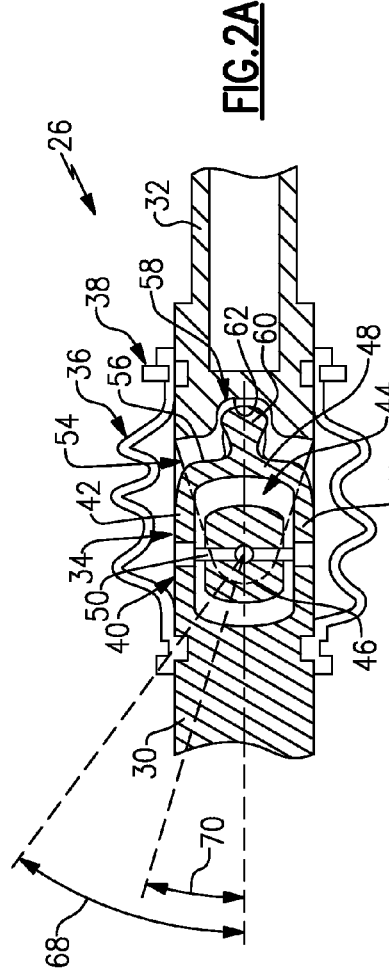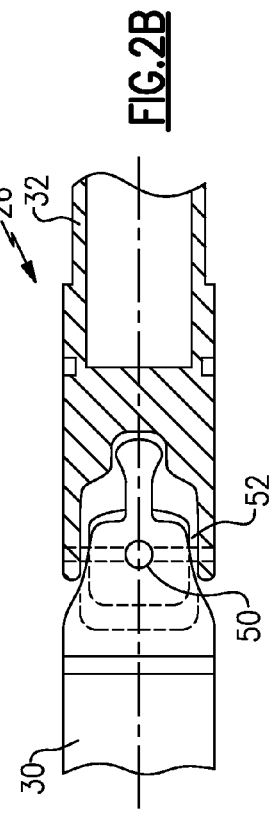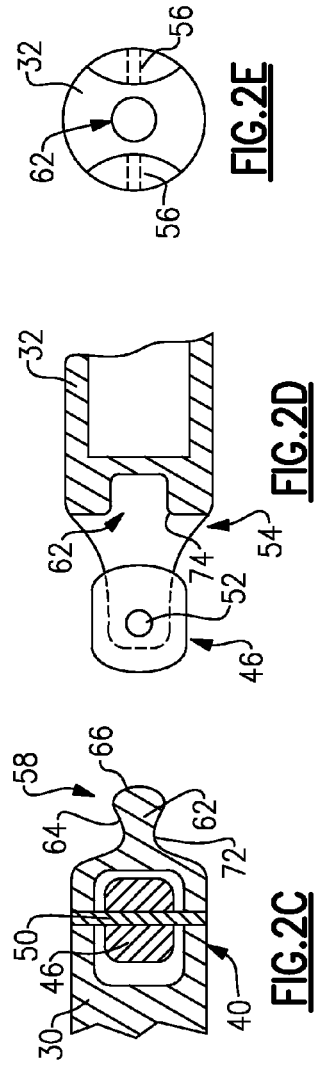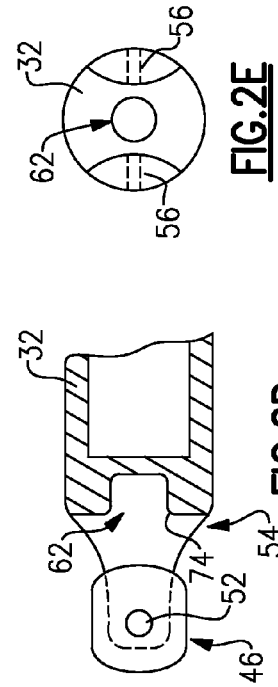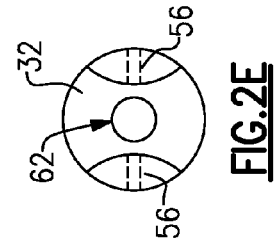

ARTICULABLE ROTATIONAL COUPLING FOR AN AIRCRAFT

BACKGROUND

This disclosure relates to an aircraft wing airfoil surface control system. More particularly, the disclosure relates to an articulable rotational coupling having a universal joint.

Universal joints are used to transmit rotational torque over small angles in many driveline applications. In adverse environments, a boot over the universal joint is used to keep moisture and dirt off the working elements of the universal joint and to help retain the lubrication around the universal joint. Damage to the universal joint boot often occurs when the universal joint is flexed beyond the angle for which the universal joint boot was designed. Undesirably large angles may result during installation of the driveshaft or torque tube assembly into the aircraft or if one of the torque tubes breaks during operation, for example. This results in the universal joint boot becoming torn or disengaged from the retention ring on the end of the universal joint boot. As a result, dirt and moisture may enter the universal joint and the grease may leak from the universal joint during rotation resulting in corrosion and/or premature wear.

SUMMARY

In one exemplary embodiment, an articulable rotational coupling includes first and second shafts. A universal joint couples the first and second shaft and is configured to provide a first maximum angle between the first and second shafts. A stop assembly is configured to provide a second maximum angle between the first and second shafts that is less than the first maximum angle.

In another exemplary embodiment, an airfoil surface control system includes a movable surface. An actuator is coupled to the surface. The airfoil surface control system includes a motor. A torque tube assembly operatively couples the motor and actuator and includes first and second shafts coupled by a universal joint. The universal joint is configured to provide a first maximum angle between the first and second shafts. A stop is configured to provide a second maximum angle between the first and second shafts that is less than the first maximum angle.

BRIEF DESCRIPTION OF THE DRAWINGS

The disclosure can be further understood by reference to the following detailed description when considered in connection with the accompanying drawings wherein:

FIGS. 2A-2E illustrates a first torque tube assembly having a universal joint, wherein 2A is a side view of the assembly, 2B is a top view of the assembly, 2C is a top view of the side view of the first shaft, 2D is a side view of the second shaft, and 2E is an end view of the second shaft.

DETAILED DESCRIPTION

Figure 1:
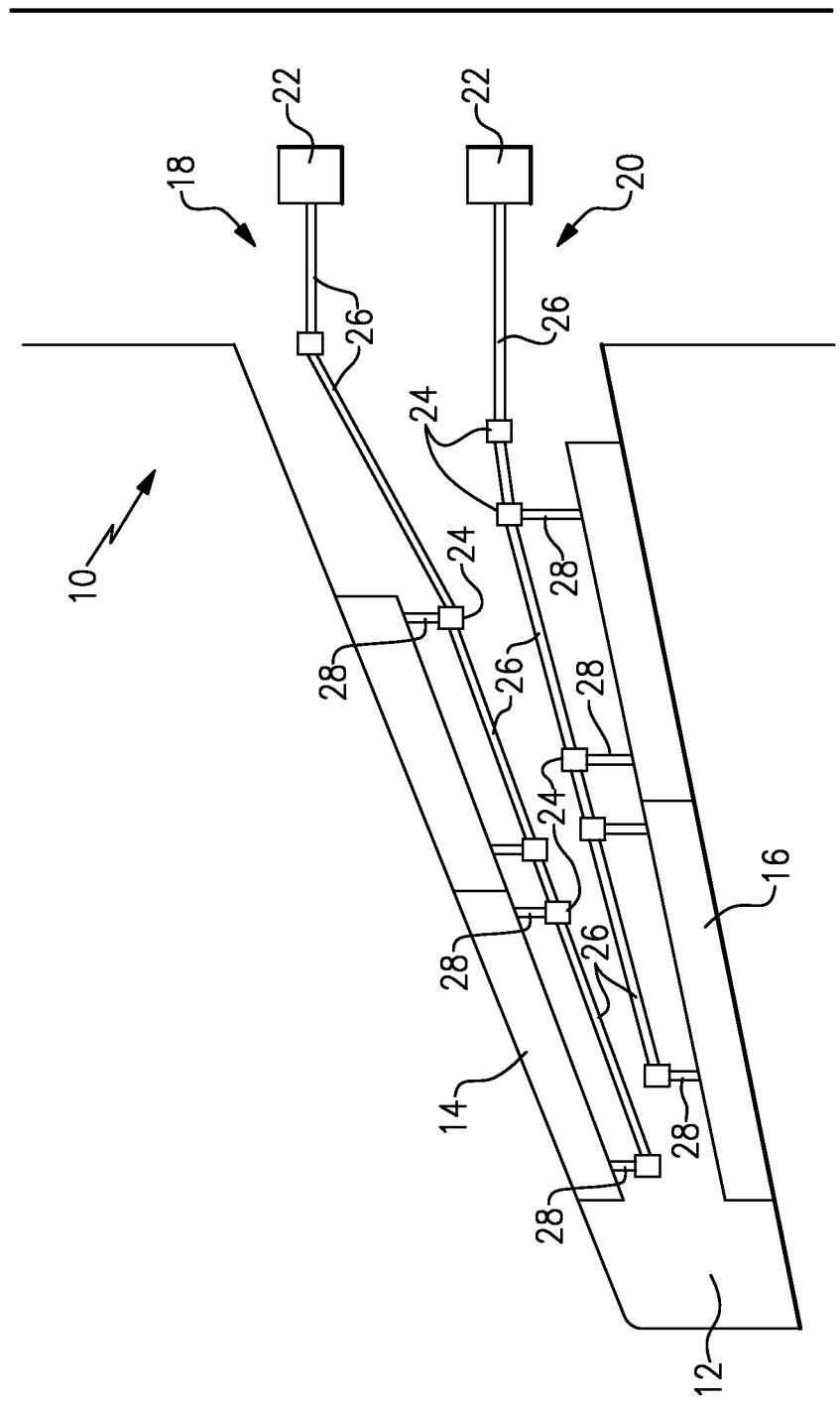
FIG. 1 is a schematic view of an aircraft having actuation systems for an aircraft having an airfoil surface control systems.

FIG. 1 schematically depicts an aircraft 10 having a wing 12. The wing 12 includes control surfaces, such as slats 14 and flaps 16. The control surfaces translate during various situations during flight, such as landing. First and second actuation systems 18, 20 are used to respectively control the slats 14 and flaps 16. It should be understood that similar actuator systems may be used to control other flight surfaces, such as spoilers, rudders, horizontal stabilizers and other rotary-powered components. In one example, each actuation system 18, 20 includes a motor 22 and gearboxes 24 coupled to one another by torque tube assemblies 26. The motor 22 drives actuators 28, which may be linear-type or rotary type arrangement, for example, to translate the respective control surfaces.

Referring to FIGS. 2A-2E, an example torque tube assembly 26 is illustrated having first and second torque tubes 30, 32 coupled to one another by a universal joint 34. A boot 36 having bellows is interconnected between the first and second torque tubes 30, 32 to enclose the universal joint 34, which includes grease to lubricate the joint during rotation. A clamp 38 may be provided on either end of the boot 36 to secure the boot 36 to its respective torque tube.

In the example, the first torque tube 30 includes a yoke 40 having spaced apart lateral sides 42 joined to one another by a wall 48 that provides a space 44. A cube or knuckle 46, which is a solid block-like structure, is arranged in the space 44 and secured to the lateral sides 42 by a first fastener 50. The second torque tube 32 includes a yoke 54 having spaced apart lateral sides 56 that are secured to the knuckle 46 by a second fastener 52. In one example, the axes of the first and second fasteners intersect one another.

The universal joint 34 permits the first and second torque tubes 30, 32 to articulate relative to one another during rotation by at least a first maximum angle 68. Permitting the first and second torque tubes 30, 32 to articulate an amount corresponding to the first maximum angle 68 may result in the boot 36 becoming unseated from one of the first and second torque tubes 30, 32. A dislodged boot may permit debris and moisture to enter the boot 36 or allow grease to escape. To this end, a stop assembly 58 is provided to limit the amount of articulation between the first and second torque tubes 30, 32 to a second maximum angle 70 that is less than the first angle 58, for example, around 20° or less. The first maximum angle 68 corresponds to the angle at which the torque tubes would bind. The second maximum angle 70 is an angle less than this "binding angle" of the universal joint.

In one example, the stop assembly 58 includes a protrusion 60 extending from the wall 48. The protrusion 60 is received in a pocket 62. The protrusion 60 and pocket 62 cooperate with one another to limit the articulation of the first and second torque tubes 30, 32. As best shown in FIGS. 2C and 2D, the protrusion 60 includes first and second radiused areas 64, 66 axially spaced apart from one another. The radiused areas 64, 66 provide sufficient relief to enable the first and second torque tubes 30, 32 to articulate relative to one another at least a desired amount of articulation for normal operation. Beyond this desired amount, which corresponds to the second angle 70, features of the stop assembly 58 will abut with one another and limit the joint articulation. In the example shown, a neck 72 of the protrusion 60 abuts a surface 74 on the second torque tube 32 at the pocket 62 to prevent further articulation.

Figure 3A:
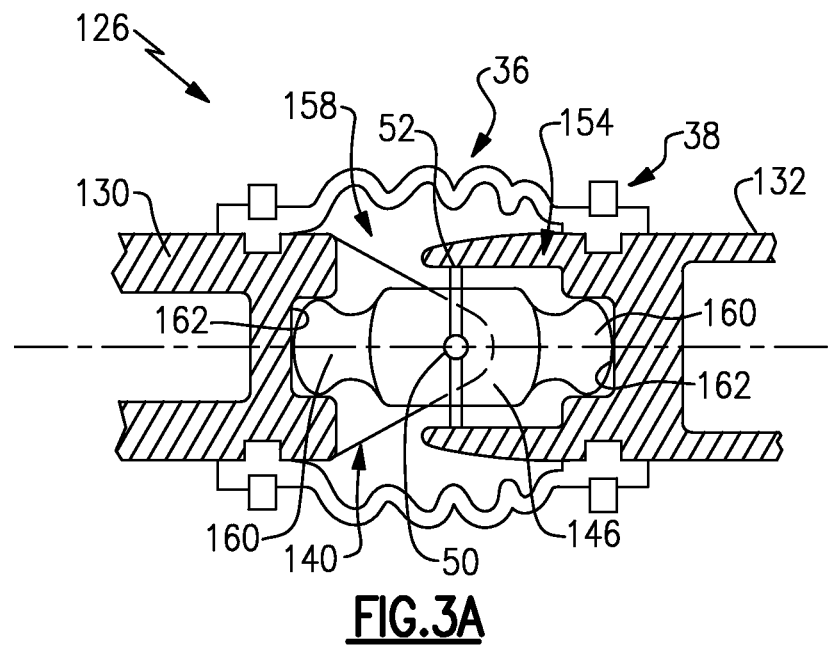
FIGS. 3A-3B illustrates a second torque tube assembly having a universal joint, wherein 3A is a top view of the assembly and 3B is a top view of a cube or knuckle.
Figure 3B:
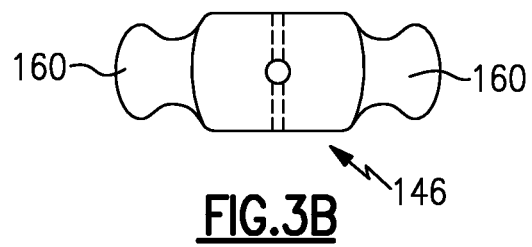

Another torque tube assembly 126 is illustrated in FIGS. 3A-3B. In this example, the knuckle 146 is coupled to first and second yokes 140, 154 and includes opposing axially spaced protrusions 160 that are received in pockets 162 in each of the first and second torque tubes 130, 132. The stop assembly 158 functions to limit articulation of the first and second torque tubes 130, 132 as described above relative to the torque tube assembly 126.

Figure 4A:
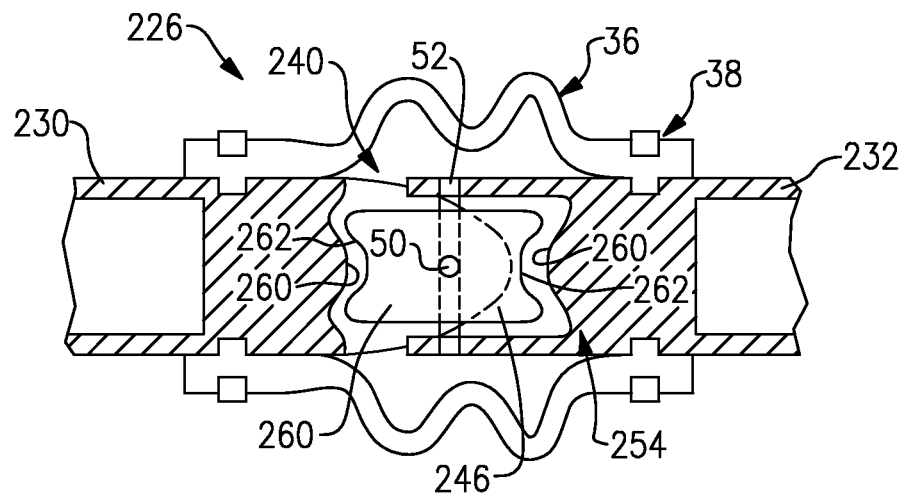
FIGS. 4A-4C illustrates a third torque tube assembly having a universal joint, wherein 4A is a top view of the assembly, 4B is an end view of a cube or knuckle, and 4C is an end view of the second shaft.
Figure 4B:
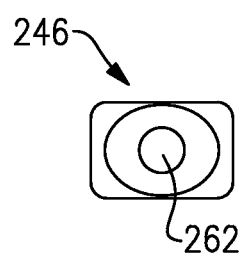
Figure 4C:
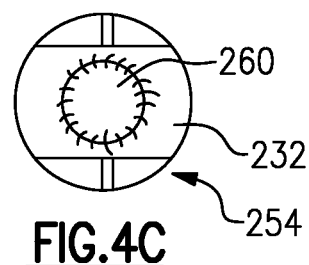

Another example torque tube assembly 226 is illustrated in FIGS. 4A-4C. Instead of protrusions being provided on the knuckle, protrusions 260 are provided on each of the first and second torque tubes 230, 232. The pockets 262 are provided on opposing sides of the knuckle 246, which is coupled to the first and second yoke 240, 254.

The stop assembly prevents damage to the universal joint during manufacturing, shipping, handling, assembly and operation. In a situation where a torque tube breaks, the stop mechanism helps to limit the angle at which the lose end of the torque tube whips around. In current designs, if the torque tube breaks or becomes disconnected, the lose end of the torque tube is contained by a containment rings located on the frame of the aircraft and surrounding the torque tubes. The disclosed stop assembly may reduce the number of containment rings required or in some cases eliminate them all together.

Although an example embodiment has been disclosed, a worker of ordinary skill in this art would recognize that certain modifications would come within the scope of the claims. For that reason, the following claims should be studied to determine their true scope and content.

What is claimed is:

1. An articulable rotational coupling comprising:
   first and second shafts;
   a universal joint coupling the first and second shaft and configured to provide a first maximum angle between the first and second shafts; and
   a stop assembly configured to provide a second maximum angle between the first and second shafts that is less than the first maximum angle; and
   wherein the stop assembly includes a first stop feature provided by one of the first and second yokes, and second stop feature provided by the knuckle, the first and second stop features engaging one another to provide the second maximum angle, wherein the knuckle includes opposing sides, the second stop feature provided by a pocket on each of the opposing sides, and the first stop feature provided by a protrusion in each of the first and second shafts.

2. The coupling according to claim 1, wherein the first and second shafts respectively include first and second yokes coupled to one another by a knuckle.

3. The coupling according to claim 2, wherein the first and second yokes are joined to the knuckle by first and second fasteners that have intersecting axes.

4. The coupling according to claim 2, comprising a boot enclosing the universal joint and clamped to the first and second shafts.

5. The coupling according to claim 2, wherein each of the first and second yokes include spaced apart lateral sides, and the knuckle is disposed radially inwardly of the lateral sides and joining the yokes to one another.

6. The coupling according to claim 5, wherein the first yoke includes a wall interconnecting the lateral sides of the first yoke to provide an enclosed space within which the knuckle is arranged.

7. The coupling according to claim 6, wherein the stop assembly includes a protrusion extending from the wall and configured to cooperate with the second shaft to establish the second maximum angle.

8. An articulable rotational coupling comprising:
   first and second shafts;
   a universal joint coupling the first and second shaft and configured to provide a first maximum angle between the first and second shafts, wherein the first and second shafts respectively include first and second yokes coupled to one another by a knuckle;
   a stop assembly configured to provide a second maximum angle between the first and second shafts that is less than the first maximum angle; and
   wherein each of the first and second yokes include spaced apart lateral sides, and the knuckle is disposed radially inwardly of the lateral sides and joining the yokes to one another, wherein the first yoke includes a wall interconnecting the lateral sides of the first yoke to provide an enclosed space within which the knuckle is arranged, wherein the stop assembly includes a protrusion extending from the wall and configured to cooperate with the second shaft to establish the second maximum angle, wherein the second shaft includes a socket receiving the protrusion.

9. An articulable rotational coupling comprising:
   first and second shafts;
   a universal joint coupling the first and second shaft and configured to provide a first maximum angle between the first and second shafts, wherein the first and second shafts respectively include first and second yokes coupled to one another by a knuckle;
   a stop assembly configured to provide a second maximum angle between the first and second shafts that is less than the first maximum angle; and
   wherein each of the first and second yokes include spaced apart lateral sides, and the knuckle is disposed radially inwardly of the lateral sides and joining the yokes to one another, wherein the first yoke includes a wall interconnecting the lateral sides of the first yoke to provide an enclosed space within which the knuckle is arranged, wherein the stop assembly includes a protrusion extending from the wall and configured to cooperate with the second shaft to establish the second maximum angle, wherein the protrusion includes first and second radiused areas and a neck, and the second shaft includes a surface engaging the neck to define the second maximum angle.

10. An articulable rotational coupling comprising:
    first and second shafts;
    a universal joint coupling the first and second shaft and configured to provide a first maximum angle between the first and second shafts, wherein the first and second shafts respectively include first and second yokes coupled to one another by a knuckle; and
    a stop assembly configured to provide a second maximum angle between the first and second shafts that is less than the first maximum angle, wherein the stop assembly includes a first stop feature provided by the first yoke, and second stop feature provided by the second yoke, the first and second stop features engaging one another to provide the second maximum angle.

11. An airfoil surface control system comprising:
    a wing having a movable surface;
    an actuator coupled to the surface;
    a motor; and
    a torque tube assembly operatively coupling the motor and actuator and including first and second shafts coupled by a universal joint, the universal joint configured to provide a first maximum angle between the first and second shafts, and a stop assembly configured to provide a second maximum angle between the first and second shafts that is less than the first maximum angle; and
    wherein the first and second shafts respectively include first and second yokes coupled to one another by a knuckle, a boot enclosing the universal joint, each of the first and second yokes include spaced apart lateral sides, and the knuckle is disposed radially inwardly of the lateral sides and joining the yokes to one another, wherein the stop assembly includes a first stop feature provided by the first yoke, and second stop feature provided by the second yoke, the first and second stop features engaging one another to provide the second maximum angle.

12. The system according to claim 11, wherein the movable surface is a slat.

13. The system according to claim 11, wherein the movable surface is a flap.

* * * * *